(12) United States Patent
Schur

(10) Patent No.: US 6,514,551 B1
(45) Date of Patent: Feb. 4, 2003

(54) PROCESS FOR IMPROVING THE DURABILITY OF, AND/OR STABILIZING, MICROBIALLY PERISHABLE PRODUCTS

(76) Inventor: Jorg Peter Schur, Heideweg 51, D-41844 Wegberg (DE)

(*) Notice: Subject to any disclaimer, the term of this patent is extended or adjusted under 35 U.S.C. 154(b) by 0 days.

(21) Appl. No.: 09/620,872

(22) Filed: Jul. 21, 2000

Related U.S. Application Data

(63) Continuation of application No. 08/737,655, filed as application No. PCT/EP96/01364 on Mar. 28, 1996.

(30) Foreign Application Priority Data

Mar. 31, 1995 (DE) .......................... 195 12 147

(51) Int. Cl.⁷ .............................. A23B 4/14; A23B 4/20
(52) U.S. Cl. .................... 426/335; 426/601; 426/656
(58) Field of Search ................. 426/656, 335, 426/601

(56) References Cited

U.S. PATENT DOCUMENTS

| | | | |
|---|---|---|---|
| 3,518,096 A | | 6/1970 | Layton |
| 3,908,031 A | * | 9/1975 | Wistreich et al. |
| 4,446,161 A | * | 5/1984 | Friedman et al. |
| 4,927,651 A | | 5/1990 | Kumani |
| 5,474,774 A | | 12/1995 | Walker |
| 5,527,552 A | | 6/1996 | Todd, Jr. |
| 5,661,104 A | * | 8/1997 | Virgilio |

FOREIGN PATENT DOCUMENTS

| | | | |
|---|---|---|---|
| DE | 2423076 | | 5/1974 |
| DE | 31 38 277 | | 4/1982 |
| DE | 196 17 278 A1 | | 11/1997 |
| EP | 0 103 878 A2 | | 3/1984 |
| EP | 0 557 946 A1 | | 9/1993 |
| FR | 2.228.434 | | 12/1974 |
| GB | 172993 | * | 4/1921 |
| GB | 790075 | | 2/1958 |
| GB | 1060447 | | 3/1967 |
| JP | 62126931 | | 6/1987 |
| JP | 62111675 | * | 5/1997 |
| WO | WO 94/14414 | | 7/1994 |

OTHER PUBLICATIONS

Ullmans Encyklopädie der technischen Chemie, 4. Aufl., Bnd. 8, 1974, 438, 439.
Database WPI, Section CH, Week 8302, Derwent Publications Ltd., London, GB; Class D13, AN 83–03563K & JP 57 194 775, (Asama Kasei KK) Nov. 30, 1982.
Kabara, Jon J. [Hrsg.] Cosmetic and Drug Preservation, 1984, S.237–270; 275–297.
Lück, Erich: Chemische Lebensmittelkonservierung, 2. Aufl. 1986, S.110–113.
Database WPI, Section CH, Week 8726, Derwent Publications Ltd., London, GB; Class D13, AA 87–181806 & JP 62 111 675 (Sankaru Ocean) May 22, 1987.
Database WPI, Section CH, Week 9028, Derwent Publications Ltd., London, GB; Class C03, AA 90–213153 & JP 02 142 703 (Kurita Water Ind KK) May 31, 1990.
Database WPI, Section CH, Week 9411, Derwent Publications Ltd., London, GB; Class D13, AA 94–088588 & JP 06 038 678 (Okubo T), Feb. 15, 1994.
Chemical Abstracts: vol. 102: 165 387u (1985).
Chemical Abstracts: vol. 107: 133 021 g (1987).
Chemical Abstracts: vol. 117: 688 48x (1992).
Chemical Abstracts: vol. 121: 337 89j (1994).

* cited by examiner

*Primary Examiner*—Helen Pratt
(74) *Attorney, Agent, or Firm*—John S. Child, Jr.

(57) ABSTRACT

The present invention relates to a process for improving the durability of, and/or stabilizing, microbially perishable products, in which, during the process for preparing, processing or packaging the products, their surfaces and/or their environment, in particular the environmental air and/or the surfaces of the utensils or other materials which come directly or indirectly into contact with the products, are impacted with one or more process adjuvants, the process adjuvant comprising at least one microbicidally active flavouring substance.

6 Claims, No Drawings

PROCESS FOR IMPROVING THE DURABILITY OF, AND/OR STABILIZING, MICROBIALLY PERISHABLE PRODUCTS

This application is a continuation-in-part application of U.S. Application No. 08/737,655, filed Feb. 18, 1997, now abandoned entitled "Process for improving the durability of, and/or stabilizing, microbially perishable products", which is the U.S. National Phase of PCT application PCT/EP96/01364, filed Mar. 28, 1996. This application also claims priority under U.S.C. §119(a) from German Patent No. 195 12 147.3, filed Mar. 31, 1995. The entire disclosures of all the above identified applications are incorporated by reference herein.

The present invention relates to a process for improving the durability of, and/or stabilizing, microbially perishable products, to a process adjuvant for implementing this process, and also to the use of the process adjuvant for impacting the surfaces of microbially perishable products and or their environment.

Industrially processed foodstuffs, animal feeds, cosmetics, pharmaceuticals and other products which are susceptible to microbial spoilage must keep for a certain period of time, which is not too short, in order, following transport and marketing by the usual routes, to reach the consumer in unspoiled condition. In addition to this, the consumer does not expect the product he has bought to perish immediately after purchase but, on the contrary, that it will be possible to keep it in storage for some days or weeks, depending on the product.

Without being treated, most foodstuffs and animal feeds would perish within a few days since fungi and/or bacteria would be able to multiply in an unhindered manner, at best restricted by refrigeration, on a nutrient medium which was ideal for them. Typical examples are the spoilage of bread by moulds, e.g. Aspergillus niger, of meat products (e.g. sausage) by enterobacteria or lactobacilli and the contamination of poultry by salmonellas, among many others. Since fungi, including yeast and/or their spores, and also Gram-positive and Gram-negative bacteria, are ubiquitous wherever a sterile environment has not been created by special procedures which are expensive and not applicable industrially for economic reasons, suitable countermeasures have to be taken.

Conventionally, therefore, foodstuffs, animal feeds, cosmetics, pharmaceuticals, paints, paper and celluloses and other perishable products are preserved using preservatives which, according to the Codex Alimentarius List of the Food and Agriculture Organization (FAO/WHO Food Standard Programme) are listed, as "synthetic preservatives", in Division 3 Food Additives Preservatives 3.73 and mainly employed in the form of single chemical substances or combinations of these substances.

The preservatives which are included in the abovementioned list possess bacteijostatic and/or fungistatic activity and substantially improve dura-bility. However, they are rejected by many consumers since their effects on the health of the consumer are not known aiid/or harmful- iifluences cannot be excluded, in particular in association with repeated intake over a long period of time.

A particular disadvantage of these preservatives is that they are added to the foodstuff regularly. As a result, relatively high concentrations of these preservatives also enter the human body during consumption. The reactions in the form of allergic diseases which are seen much more frequently nowadays are the consequence.

An alternative to preservation by adding synthetic preservatives is thermal inactivation of microorganisms, for example by pasteurization. Pasteurization means a thermal treatment at from 70 to 85° C. for an exposure time of from 30 to 120 minutes.

While pasteurization substantially improves the durability of products which have been treated in this way, it is nevertheless technically elaborate and consumes a very large amount of energy. Over and above this, the viability of spores is often either not impaired or only impaired to a very limited extent. Furthermore, pasteurization is not applicable to temperature-sensitive products or leads to a not inconsiderable loss of quality, since the "degree of freshness" of the pasteurized product declines, at the very latest, as a result of the second thermization (up to 85° C.) which is often required. In addition, it is precisely the valuable constituents of foodstuffs, cosmetics or pharmaceuticals, for example vitamins, amino acids and many pharmaceutical active compounds, which are thermolabile, so that thermal treatment under the customary conditions of pasteurization is out of the question.

Another possibility for improving durability is to pack the product which is endangered by spoilage under nitrogen or $CO_2$ in an airtight manner, or to supply it in vacuum packs as is the case, for example, with ground coffee. However, these processes are expensive and elaborate and therefore not applicable to many foodstuffs.

The object of the invention is, therefore, to provide a process for improving the durability of, and/or stabilizing, microbially perishable products, in which, during the process for preparing, processing or packaging the products, their surfaces and/or their environment, in particular the environmental air and/or the surfaces of the utensils or other materials which come directly or indirectly into contact with the products, are impacted with one or more process adjuvants. By these means, it is intended, in particular, to make it possible to improve the durability of, and stabilize, foodstuffs, animal feeds, cosmetics, pharmaceuticals and other products which are endangered by spoilage without having to mix synthetic preservatives into these treated substances or use pasteurization at temperatures of from 70 to 85° C. The intention is also to achieve a reduction in the quantity of the gents employed for the improvement in durability and the stabilization.

According to the invention, this object is achieved by a process adjuvant which comprises at least one microbicidally active flavouring substance, preferably at least two flavouring substances.

The invention furthermore relates to a process adjuvant which is characterized in that it comprises at least one microbicidally active flavouring substance, preferably at least two flavouring substances.

Finally the present invention also relates to the use of the process adjuvant for impacting the surfaces of microbially perishable products and/or their environment for the purpose of spreading, lubricating, emulsifying, separating, cleansing, spraying, nebulizing, gasifying and cutting.

The flavouring substances which are contained in the novel process adjuvants are exclusively natural or identical-to-nature flavouring substances which are recognized, under FEMA, as being safe (GRAS—generally recognized as safe). The aforementioned list is the FEMA GRAS Flavouring Substances List GRAS 3–16 Nos. 2001–3834 (as of 1993), which lists natural and identical-to-nature flavouring substances which are authorized by the American Public Health Authority FDA for use in foodstuffs (FDA Regulation 21 CFR 172.515 for identical-to-nature flavouring substances (Synthetic Flavouring Substances and Adjuvants) and FDA Regulation 21 CFR 182.20 for natural flavouring substances (Natural Flavouring Substances and Adjuvants). Flavouring substances which meet these FDA standards can be employed in a "quantum satis" manner, i.e. they may be present in the foodstuff up to the highest concentration at which they still do not impair the smell or taste of the foodstuff to which they have been added. The flavouring substances listed under FEMA coincide, to a large extent, with the substances contained in the corresponding European standard COE.

According to the invention, the flavouring substances classified as "NAT4" according to Article V of European Community Directive Flavourings (22.06.88) may also be used provided that they are regarded as being safe in accordance with the abovementioned FEMA GRAS list. NAT4 substances are substances which can be declared to be identical-to-nature-under certain conditions, for example when the substances are employed in combination with, and as a constituent of, a natural or identical-to-nature flavouring substance.

The particular advantage of the novel process adjuvants is that, owing to their constituents being listed in the FEMA GRAS list and being recognized by the U.S. Public Health Authority FDA, which is probably the most critical health authority of all, as being harmless, they can readily be added to foodstuffs in the "quantum satis" concentration range.

A further particular advantage is that the process adjuvants do not affect the taste and smell of the treated products.

The novel process adjuvants are employed, for example, in the form of lubricants, emulsifiers, washing agents, sprays, nebulizing agents, gas-phase-active agents, heat-transferring agents and also cutting agents or separating agents. The process adjuvants may also be employed as additives which are included in the said agents.

It is important for the invention that the process adjuvants are not added to the foodstuffs or mixed with them. Rather, it is only the surfaces or cut surfaces of the foodstuffs which are impacted with the process adjuvants. This can take place by the foodstuff surfaces or cut surfaces being impacted directly with the process adjuvants. However, it is also possible to treat the surfaces of utensils, production machines, packaging equipment, transport equipment, packaging materials and the environmental air with the process adjuvant.

It is surprising, according to the invention, that the microbicidal effect of the process adjuvants is seen even when low concentrations are used. Only from 0.01 to 5 g, preferably from 0.05 to 1 g per kg of foodstuff is used when the process adjuvants are impacted. In a preferred embodiment, 0.01 to 1.0 g/kg of process adjuvant per food stuff is used, more preferred 0.01 to 0.5 g/kg, and most preferably 0.05 to 0.5 g/kg. When they are used for the environmental air, only from 0.001 to 10 g are employed, for example, per M3 of air. Indeed, only from 0.000001 g to 0.1 g/cm2 of surface is used for the surfaces of utensils.

When these concentrations are adhered to, the detectable quantities in the foodstuffs are only about 0.001% by weight. By contrast, from 0.1 to 3% by weight of preservative is regularly present in the foodstuffs in accordance with the state of the art. Despite these extremely low concentrations, it is surprising, according to the invention, that an extension of the durability of up to 50% can be achieved as compared with conventionally preserved foodstuffs.

It is particularly to be emphasized, and astonishing, that even 0.001% by weight of a process adjuvant applied indirectly to foodstuffs, is sufficient to stabilize and/or improve durability while at the same time increasing product quality.

This effect is all the more surprising in that the time over which the flavouring substances employed in accordance with the invention exert their microbicidal effect is less than 24 hours, preferably less than 12 hours. It is very particularly preferred to select process adjuvants and concentrations such that the time for the microbicidal effect is less than 1 hour, preferably less than 15 minutes.

In contrast to this, the aim of the conventional preservatives is to be active in the foodstuff for as long as possible, i.e. over weeks and months. Despite the very short time during which the process adjuvants employed in accordance with the invention exert their effect, the durability is significantly increased as compared with that of foodstuffs which have been treated in accordance with the state of the art with conventional preservatives or preservation processes.

The novel process adjuvant comprises flavouring substances which are selected from the group of the alcohols, aldehydes, phenols, acetates, acids, esters, terpenes, acetals, and their physiologically tolerated salts, ethereal oils and plant extracts.

Preferred embodiments of the novel process adjuvants comprise one or more flavouring substances selected from one or more of the following groups:

I. Alcohols

Acetoin (acetylmethylcarbinol), ethyl alcohol (ethanol), propyl alcohol (1-propanol), isopropyl alcohol (2-propanol, isopropanol), propylene glycol, glycerol, benzyl alcohol, n-butyl alcohol (n-propylcarbinol), iso-butyl alcohol (2-methyl-1 propanol), hexyl alcohol (hexanol), L-menthol, octyl alcohol (n-octanol), phenyl ethyl alcohol (2-phenylethanol), cinnamyl alcohol (3-phenyl-2-propen-1-ol), a-methylbenzyl alcohol (1-phenylethanol), heptyl alcohol (heptanol), n-amyl alcohol (1-pentanol), iso-amyl alcohol (3-methyl-1-butanol), anise alcohol (4-methoxybenzyl alcohol, p-anise alcohol), citronellol, n-decyl alcohol (n-decanol), geraniol, b-hexenol (3-hexenol), hydrocinnamyl alcohol (3-phenyl-1-propanol), lauryl alcohol (dodecanol), linalool, nerolidol, nonadienol (2,6-nonadien-1-ol), nonyl alcohol (1-nonanol), rhodinol, terpineol, borneol, clineol (eucalyptol), anisole, cuminyl alcohol (cuminol), 1-phenyl-1-propanol, 10-undecen-1-ol and 1-hexadecanol.

II. Aldehydes

Acetylaldehyde, anisaldehyde, benzaldehyde, iso-butyl aldehyde (methyl-l-propanal), citral, citronellal, n-caproaldehyde (n-decanal), ethyl vanillin, fufurol, heliotropin (piperonal), heptyl aldehyde, (heptanal), hexylaldehyde (hexanal), 2-hexenal (β-propylacrolein), hydrocinnamaldehyde (3 phenyl-1-propanal), lauryl aldehyde (dodecanal), nonyl aldehyde (n-nonanal), octyl aldhehyde (n-octanal), phenylacetaldehyde (1-oxo-2-phenylethane), propionaldehyde (propanal), vanillin, cinnamaldehyde (3-phenylpropenal), perillaldehyde and cuminaldehyde.

III. Phenols

Thymol, methyleugenol, acetyleugenol, safrole, eugenol, isoeugenol, anethole, phenol, methyl chavicol (estragole; 3-(4-methoxyphenyl)-1-propene), carvacrol, α-bisabolol, fomnesol, anisole, (methoxybenzene) and propenylguaethol (5-propenyl-2-ethoxyphenol).

IV. Acetates

Isoamyl acetate (3-methyl-1-butyl acetate), benzyl acetate, benzylphenyl acetate, n-butyl acetate, cinnamyl acetate (3-phenylpropenyl acetate), citronellyl acetate, ethyl acetate, eugenol acetate, (acetyleugenol), geranyl acetate, hexyl acetate (hex anyl ethanoate), hydrocinnamyl acetate (3-phenylpropyl acetate), linalyl acetate, octyl acetate, phenylethyl acetate, terpinyl acetate, triacetin (glyceryl triacetate), potassium acetate, sodium acetate, and calcium acetate.

V. Acids and/or Their Physioloaically Tolerated Salts

Acetic acid, aconitic acid, adipic acid, formic acid, malic acid (1-hydroxysuccinic acid), caproic acid, hydrocinnamic acid, (3-phenyl-1-propionic acid), pelargonic acid (nonanoic acid), lactic acid (2-hydroxypropionic acid), phenoxyacetic acid (glycolic acid phenyl ether), phenylacetic acid (a-toluic acid), valeric acid (pentanoic acid), isovaleric acid (3-methylbutanoic acid), cinnamic acid (3-phenylpropenoic acid), citric acid, mandelic acid (hydroxyphenylacetic acid), tartaric acid (2,3-dihydroxybutanoic diacid; 2,3-dihydroxysuccinic acid), fumaric acid, and tannic acid.

VI. Esters

Allicin.

VII. Terpenes

Camphor, limonene and)i-caryophyRene.

VIII. Acetals

Acetal, acetaldehyde dibutyl acetal, acetaldellyde dipropyl acetal, acetaldehyde phenethylpropyl acetal, cinnamaldehyde ethylene glycol acetal, decanal dimethyl acetal, heptanal dimethyl acetal, heptanal glyceryl acetal and benzaldehyde propylene glycol acetal.

IX. Polyphenol

X. Ethereal Oils and/or Alcoholic or Glycolic Extracts, or Extracts Which are Obtained by $CO_2$ High-pressure Processes, from the Plants Listed Below:

a) Oils or extracts containing a high proportion of alcohols:

balm, coriander, cardamom, eucalyptus;

b) Oils or extracts containing a high proportion of aldehydes:

Eucalyptus citriodora, cinnamon, lemon, lemongrass, balm, citronella, lime and orange;

c) Oils or extracts containing a high proportion of phenols:

oreganum, thyme, rosemary, orange, carnation, fennel, camphor, tangerine, anise, cascarilla, tarragon and allspice;

d) Oils or extracts containing a high proportion of acetates:

lavender;

e) Oils or extracts containing a high proportion of esters:

mustard, onion and garlic;

f) Oils or extracts containing a high proportion of terpenes:

pepper, Seville orange, caraway, dill, lemon, peppermint and nutmeg.

Isopropanol and ethanol are not used if the process adjuvant comprises only one of the said flavouring substances. Surprisingly, it has been found that a combination of at least two of the given flavouring substances has a far greater effect than that produced by one single substance.

Most of the flavouring substances listed in the GRAS FEMA list are not water-soluble, i.e. they are hydrophobic. If they are employed in foodstuffs which primarily contain fat, they can be used directly without solvents owing to their lypophilic character. However, the proportion of lypophilic foodstuffs is relatively small. In order to ensure that they can exert their effect in foodstuffs, animal feeds, cosmetics or pharmaceuticals which are in the main hydrophilic, they are preferably employed in combination with a water-soluble solubilizer. In order to do justice to the claim of this invention—to make available process adjuvants which are harmless from the point of health—use is made exclusively of solubilizer-flavouring substances, e.g. alcohols, which are authorized for food stuffs.

The process adjuvants are used undiluted and/or in water-soluble dilutions with water and/or solvents (e.g. alcohols) which are authorized for food stuffs and/or in fat-soluble dilutions with vegetable (fatty) oils.

In the novel process adjuvants, use can be made, for example, of readily water-soluble alcohols, preferably in concentrations of from 0.1 to 99% by weight, based on the process adjuvant, in combination with other flavouring substances. In a preferred embodiment, the process adjuvant comprises a GRAS flavoring compound that is an alcohol, and an additional different GRAS flavoring compound. Preferably, the additional GRAS flavoring compound is at least 0.001% by weight of the processing adjuvant, more preferably at least 0.01% by weight, and most preferably at least 0.05% by weight. The novel process adjuvants preferably comprise less than 50% by weight of ethanol, isopropanol or benzyl alcohol, or of a mixture of these compounds. It is particularly preferred if the proportion of the said alcohols is less than 30% by weight, in particular less than 20% by weight. Provided process adjuvants are employed which comprise benzyl alcohol and at least one further flavouring substance, the proportion of benzyl alcohol can also be more than 50% by weight. Surprisingly, the process adjuvants which comprise, for example, only 20% by weight of ethanol or isopropanol in combination with flavour aldehydes and flavour phenols in concentrations which are in the per 1000 range possess a very powerful fungicidal and bactericidal effect; even process adjuvants which comprise 1% by weight of the said water-soluble alcohols in combination with less than 3% of flavour aldehyde and flavour phenol exhibit a 70 to 100% microbicidal effect.

From the above, it follows that the novel process adjuvants possess surprising microbicidal effects in the production environment or in the production process environment.

In this context, preference is given to using the process adjuvants for producing foodstuffs, animal feeds, cosmetics, pharmaceuticals, paints, paper and/or cellulose.

In particularly preferred embodiments, the process adjuvants are used for improving the durability of, and stabilizing, foodstuffs selected from the following group: bread, baked goods, baking agents, baking powders, blancmange powders, beverages, dietetic foodstuffs, essences, delicatessen foodstuffs, fish and fish products, potatoes and products based on potatoes, spices, flour, margarine, fruit and vegetables and products based on fruit and vegetables, pickled foodstuffs, starch products, confectionery, soups, pastas, meat and meat products, milk, dairy and cheese products, poultry and poultry products, oils, fat and oil-containing or fat-containing products.

The novel process adjuvant exerts its effect in the environment of the product, for example a foodstuff or animal feed, which is susceptible to spoilage, eg. on machine parts which are in contact with the product to be worked or processed, or in the air. As a result of direct contact with the surface of the product susceptible to spoilage, they also exert their effect there, i.e. they display their effect on the surface or, when penetrating into the product, in the latter itself.

The particular advantage of the novel process adjuvant is, therefore, that on the one hand it decontaminates in a dependable manner, with its activity against Gram-positive and Gram-negative ba,teria, fungi, including yeast, and viruses having been proved, while, on the other hand, it does not constitute any danger for the consumer of the foodstuff since it is completely harmless to this consumer and does not possess any microbicidal, technological after effect in the foodstuff, since the microbicidal activity relates to the production environment, which is freed from contaminating microorganisms by the novel measures.

The novel process adjuvant can be a lubricant which is used simultaneously for lubrication, for decontamination of the lubricated parts and consequently, indirectly, for stabilizing the durability of the products which are in contact with these parts.

According to the invention, the process adjuvant can also be an emulsifier, a separating agent or a cleansing agent. Such agents are used for emulsification and/or cleansing and consequently also for decontaminating surfaces, articles, machines, equipment, utensils, cutting surfaces and cutting devices, transport devices and the like. The adjuvant can furthermore be used for decontaminating and cleansing foodstuffs, raw materials, cosmetics, pharmaceuticals, paints, paper, cellulose, livestock, poultry, fish and garbage.

In addition to this, the novel process adjuvant can be a spray. Such a spray enables the decontaminating active compounds to be finely distributed on all machine parts, transport devices, cutting devices, working surfaces, etc., and can simultaneously result in foodstuffs which are packed immediately after the cutting or separating procedure and/or packaging/portioning procedure being stored in a climate which possesses decontaminating and/or durability-stabilizing properties as the result of enclosed spray. In addition to this, nebulizable or sprayable embodiments are very economical owing to the comparatively small amounts required.

The spray can also be blown or sprayed/nebulized into and/or onto packaging, for example packets, cartons or the like, in order thereby to preserve the product which is packed therein for a longer period.

The sprays can also be nebulized in the production environment (surroundings, refrigeration, ventilation, fresh air) at hygienic weak spots (e.g. cooling sections), in order thereby to reduce the number of organisms without the personnel operating in this environment being harmed.

The process adjuvants may also be employed for spraying onto foodstuff surfaces or cut surfaces in order to eliminate or reduce the spoilage causing agents which are present on the foodstuffs.

Furthermore, these sprays can be employed in transport equipment, stores and coldrooms, and the like.

The process adjuvant may also be employed by dipping the foodstuff, packaging materials, all machine parts, transport devices, cutting devices, working surfaces, etc., into the process adjuvant.

In a further embodiment, the novel process adjuvant is a gas-phase active agent which is used for active decontamination and/or deodorizing in the gas phase in systems, such as packages, waste systems, container systems, transport spaces, storage spaces and the like, which are more or less closed. The packed goods, which are contained, transported or stored in the container, as well as the air and the particular environment, profit from the effect of the gas-phase agent.

The novel process adjuvant has also proved to be a good heat transferring agent. By heat-transferring agents are meant cooling agents, heating agents and warming agents which can be used as decontaminating additives in circulating circulatory systems of liquid cooling systems, heating systems and warming systems. In this context, they are added to aqueous or oily systems to prevent the growth of microorganisms in the liquids in order, for example, to prevent contamination occurring in association with the leakage of refrigeration systems.

In a particularly preferred embodiment, the novel process adjuvant is a cutting agent or separating agent for cutting knives and/or cutting devices of every kind and for all perishable products which are to be cut, in order to prevent contamination of the cutting sites.

In the foodstuffs industry, contaminations with Gram-negative or Gram-positive pathogens, moulds, yeasts and other possible spoilage-causing agents often occur at the cutting sites or separation sites of foodstuffs, which contaminations can impair, sometimes substantially, the durability of the cut or separated products and consequent cause both economic damage and damage to health. The contaminations are introduced by raw materials, product/raw material residues and personnel and also by machine parts or operationally associated processes or by the air.

Conventionally, therefore, the cut or separated foodstuffs, or the foodstuffs which are to be cut or separated, are still either pasteurized or treated technically in order to decontaminate them, and thereby preserve them, or are treated with preservatives. However, as already mentioned above, a thermal treatment is not possible or admissible in every case and can lead to a diminution in the quality of the product in some circumstances.

A flanking measure for improving the durability of foodstuffs is the purification or even disinfection of the environment using chemical disinfectants which are subject to the biocide regulation. These substances are more or less poisonous and should not be transferred to foodstuffs. However, chemical disinfection is a discontinuous measure which can, in practice, only be applied to machine parts and to the environment at particular times during production and after whose implementation it is subsequently necessary to flush with water in order to remove the residual substances. Correspondingly, the direct and permanent elimination of spoilage-causing agents is not ensured.

For this reason, attempts have been made in the state of the art to optimize machine hygiene by improving cleaning ability or by means of installations for generating or maintaining pure or organism-deficient or organism-free air. However, experience has shown that this has either not brought about an increased durability of cut or separated foodstuffs or is economically no longer justifiable or cannot be put into practice in a reliable manner.

An example from the sliced bread industry demonstrates that the durability of sliced bread is substantially reduced, in comparison with whole bread, by the cutting or separating of bread varieties such as whole dough bread, wholemeal bread, white bread, mixed bread or toast bread and then packing it. Depending on the bread variety, the durability is between 2 and 5 days. As a result of the subsequent thermal treatment (pasteurization in ovens or microwave appliances at a core temperature of from 60 to 90° C.) which is usually carried out nowadays, the durability of bread is normally extended to from 4 to approx. 20 days when using normal vapour-permeabie polyethylene bag wrappings. Owing to their lower vapour permeability, other films, for example made of polypropylene, which, however, are substantially more expensive, can achieve a longer durability. Synthetic polyester wrappings enclosing an introduced nitro-gen-containing atmosphere result in even longer durability. However, all these measures are either very costly or can only be employed for expensive special products and special markets and sometimes lead to substantial losses in the quality of the sliced bread, for example as the result of condensate formation in the bread bag, as the result of a bread consistency which is too soft, or as the result of premature drying out. None of these measures solves the real causes of the contamination by the cutting or separating process, which process, by means of the cutting device, for example the cutting blades, introduces both the possible spoilage-causing agents which are present in the environment, and those which are present in a product or on the machine, into the foodstuff and distribute them therein.

Either mineral compositions, which are no longer permitted in many countries, or vegetable cutting oils, which are often already contaminated themselves, i.e. polluted with bacteria, are customarily employed as cutting agents or separating agents. See, for example, G. Schuster: Investigations on mould contamination of sliced bread, Bäcker & Konditor [Baker and Confectioner] 27(11), pp. 345–347; G. Spicher: Die Quellen der direkten Kontamination des Brotes mit Schimmelpilzen; Das Schneidöl als Faktor der Schimmelkontamination; [The sources of direct contamination of bread with moulds; cutting oil as a factor in mould contamination]; Getreide, Mehl und Brot [Cereals, flour and bread] 32(4), pp.91–94.

There is, therefore, a pressing need, which is satisfied by the novel cutting agent or separating agent, for a cutting agent or separating agent which enables the machine parts which are in contact with the foodstuff to be decontaminated during the cutting process and thereby achieves an improved durability of the cut material.

The novel cutting agent or separating agent can be employed wherever cutting or separating is taking place on an industrial scale and the material which is being cut can be subject to spoilage by bacteria or fungi or contamination with viruses. While this applies to celluloses and paper, for example, it also applies, in particular, to foodstuffs and animal feeds.

In a preferred embodiment, the novel process adjuvant is suitable for cutting or separating bread, baked goods, fish and fish products, potatoes and products based on potatoes, fruit and vegetable and products based on fruit and vegetable, confectionary, starch products, pastas, meat and meat products, cheese products, poultry and poultry products.

If the novel process adjuvant is a cutting agent or separating agent (for example for cutting bread), this agent can then be prepared on a customary vegetable oil/fat/wax basis while adding microbicidal process adjuvants which are based on flavouring substances. The cutting agent or separating agent (for example for use in the meat products industry) can preferably, according to the invention, consist exclusively of one or more flavouring substances.

Natural emulsifiers, for example lecithins at a concentration of from 1 to 25% by weight, can be added to the vegetable oils, vegetable waxes and vegetable fats, in correspondence with the state of the art. Examples of emulsifiers are lecithins, citric acid monoglycerides, diacetyl tartaric acid, N-acetylphospha-tidylethanolamine, phosphatidyliniositol, phosphatidylserine, phosphatidic acids and phosphatidylcholine. However, if the novel cutting agent or separating agent is prepared as a water-based emulsion, vegetable oils, vegetable fats and vegetable waxes having unsaturated and saturated $C_{16}$–$C_{18}$ fatty acids, which also have a viscosity of from about 10 mPas (20° C.) to about 500 mPas (20° C.), are then used.

After having been mixed with water in a ratio of from 1:1 to 1:40, the cutting/separating agent, which has been assembled, for example, from the abovementioned fatty acids or oils and emulsifiers, can then be used as a cutting emulsion or separating emulsion (milk).

In practice, the novel cutting agent or separating agent is applied at least to the machine parts which are in contact with the material which is being cut in order to decontaminate these parts. Based on experience, the agents are employed in doses of 1–20 g/kg of foodstuff, with the dose depending on the cutting or separating device used and the material being cut.

The cutting/separating agents are usually applied to the cutting or separating devices, for example sprayed onto circular dish wheel cutting machines when slicing bread, which are then used to cut sliced bread, for example. According to the invention, parts of the cutting devices, for example circular dish knives, band slicers (rotating bandsaws), electrical or mechanical knives or knife devices, electrical or mechanical saws or sawing devices, and electrical or mechanical chain saws or devices, are wetted in this context such that the cutting or separating agent can exert a decontaminating or microbicidal effect on the corresponding machine part and also on the suiface which results from the cutting or separating.

The advantageous effect of the novel cutting/separating agents is expressed in an extended durability of the material which is being cut, for example sliced bread. It is based, not least, on the fact that the cutting and separating agent penetrates the surface of the material which is being cut and also decontaminates the deeper layers of the cut foodstuff, specifically using the flavouring substances contained in the cutting oil.

In addition to this, the flavouring substances described here also exert a microbicidal effect in the vapour phase, since most flavouring substances volatilize readily. They therefore exert their effect in the so-called environment of the foodstuff, for example in packaging the foodstuff, when the latter is packed, for example, in a film wrapping after the cutting process.

This process of decontaminating the cut material after the actual cutting procedure can be supported by a mild thermal aftertreatment of the foodstuff without the latter losing any quality in its packaging. Thus, after having been sliced, bread, for example, is packed in polyethylene films and then brought, for example by means of microwave treatment, within from 10 seconds to 5 minutes, to a core temperature of between 30° and 50° C., or treated thermally for up to 1 hour at a core temperature of from 30° to 50° C., which reinforces the decontaminating effect of the cutting or separating agent.

The advantageous effect of the cutting/separating agents can in some cases be substantially increased if the application and cutting or separating techniques are improved, or freshly developed, such that the foodstuff is intensely wetted with cutting or separating agent. For example, in experiments on bread slicing, the circular dish cutting blade was provided with separate slot guides and grooves, thereby rendering possible a more thorough and intense application of cutting or separating agent.

The following examples explain the invention.

COMPARATIVE EXAMPLE

It is already known in the state of the art that ethanol and isopropanol are microbicidal in high concentrations (75% by weight to more than 90% by weight). However, additives containing such a high concentration of ethanol or isopropanol are more likely to be undesirable owing, on the one hand, to the dangers in handling them, in particular their ready flammability, and, on the other hand, from considerations of principle, for example with regard to children or former alcoholics. However, if the ethanol or isopropanol concentration is reduced to 20% by weight, or less, based on the process adjuvant, there is no longer any detectable bactericidal or fungicidal effect, as is demonstrated in the table below.

TABLE

Microbicidal and/or fungicidal effect of ethanol and isopropanol[1]

| | Staph. aureus<br>Duration of action, 1 h | Asp. niger<br>Duration of action, 1 h |
|---|---|---|
| Isopropanol, 20% by wt. | RF[2] 0.3 | RF. 0.5 |
| Ethanol, 20% by wt. | RF 3.4 | RF 0 |
| Growth control | log CFU[3]: 7.5 | log CFU: 5.4 |
| Isopropanol, 75% by wt. | RF 7.0 | RF 5.4 |
| Ethanol, 75% by wt. | RF 7.0 | RF 5.4 |
| Growth control | log CFU: 7.0 | log CFU: 5.4 |

[1]The results were obtained by means of a quantitative suspension experiment (see "Materials and methods", Chapter 3.2).
[2]RF (reduction factor): log of original number of organisms minus log of number of surviving organisms.
[3]CFU: colony-forming units

EXAMPLES 1–5

The efficacy of process adjuvants was tested in a variety of experiments. These experiments demonstrate that these adjuvants improve durability and stability in a surprising manner when they are employed as cutting agents, as sprays, as cleansing agents or as separating agents. In this-way, it was possible greatly to reduce the number of spoilage-causing organisms on cutting surfaces, transport surfaces or slicing surfaces. At the same time, the durability of sausage, for example, was extended by 30% as compared with a conventional preservation.

Taking th example of bread, durability is significantly improved by spraying bread loaves, and slices of the bread, with cutting agent, by means of spraying the process adjuvant onto the surfaces of the cutting knives.

Taking the example of baked goods, it was possible to demonstrate that the content of moulds per m² of air was significantly reduced when a process adjuvant was nebulized. The durability was substantially improved without any further addition of preservatives to the bread or the baked goods.

EXAMPLE 1

Use of a process adjuvant as a cutting agent for cutting knives and as a spray for conveyor belts and bands in butchery.

Method Description:

a)–c) investigates the organism number of acid-formers such as lactobacilli. The customary laboratory technique, a dilution series and casting agar, was applied to determine this organism number. Nutrient medium used: KIRS agar (OXOID)

d) The spreading method was used to determine the organism-reducing effect on the surface of sausage. The number of organisms was determined beforehand, after an exposure time of 10 minutes (after spraying with HIQProSlice, registered trade mark of Schür in Process GmbH), after cooling and prior to packaging. Nutrient medium for the total number of organisms: RODAC containing TSA, TW 80 and lecithin. Surface: 25 cm²

Sample Description:

Grilling sausage was selected as the subject for the investigation.

The product has a durability of 2–3 weeks.

Grilling sausage is produced as follows:

Lean and fat are cut in the cutter and mixed with ingredients. After the intestine has been filled, the sausage is heated in water at 75° C. After cooling, the products are vacuum-packed with 3 sausages being included in each pack

| Sample no.: | Sample description |
|---|---|
| 1 | Grilling sausage, zero sample |
| 2 | Zero sample + ProSlice on outer skin (1 g/1000 g of sausage) |
| 3 | Equipment decontaminated with ProSlice |
| 4 | As 3 + ProSlice on outer skin (1 g/1000 g of sausage) |
| 5 | As 3 + 1% ProSlice as additive |
| 6 | As 5 + ProSlice on outer skin (1 g/1000 g of sausage) |
| 7 | As 3 + 3% ProSlice as additive |
| 8 | As 7 + ProSlice on outer skin (1 g/1000 g of sausage) |

Results:

a) The durability of a product, when used as additive.

| | Number of lactobacilli organisms/g | | |
|---|---|---|---|
| Sample No. | Day 1 | Day 7 | Day 14 |
| 1 | 100 | 31,000 | 2,100,000 |
| 5 | 200 | 26,000 | 5,000,000 |
| 7 | 100 | 40,000 | 5,000,000 | b) The durability of a product, when used as spray on the outer skin of the product.

| | Number of lactobacilli organisms/g | | |
|---|---|---|---|
| Sample No. | Day 1 | Day 7 | Day 14 |
| 1 | 100 | 31,000 | 2,100,000 |
| 4 | <100 | 2,700 | 450,000 |
| 6 | <100 | 19,000 | 1,100,000 |
| 8 | <100 | 18,000 | 1,200,000 | c) The durability of a product, when used as spray on surfaces directly in contact with the product.

| Sample No. | Day 1 | Day 7 | Day 14 |
|---|---|---|---|
| 1 | 100 | 31,000 | 2,100,000 |
| 3 | 200 | 5,500 | 900,000 | d) The organism number after spraying on the outer side of the product. Beforehand (Sample 1)

| Sample No. | Total number of organisms/25 cm² beforehand | Total number of organisms/25 cm² after 10 minutes exposure time |
|---|---|---|
| 1 | 120 | 95 |
| 2 | 65 | No growth |
| 4 | 110 | No growth |
| 6 | Lawn growth | No growth |
| 8 | 18 | No growth |

Commments on:

a) The durability of a product, when used as additive.

The Table demonstrates that the addition of HIQProSlice, even in substantial quantities, has no effect on the extension of durability. The HIQProSlice has no preserving effect when added as an additive.

b) The durability of a product, when used as a spray on the outside of the product.

The table demonstrates that an improvement in durability is obtained by spraying the sausage with 1 g per 1000 g of product.

c) The durability of a product, when used as a spray on surfaces directly in contact with the product.

The Table demonstrates that an improvement in durability is obtained by spraying the surfaces and utensils.

d) The number of organisms after spraying the outside of the product.

A reduction in the number of microorganisms of an RF log of at least twvo is obtained within 10 minutes by spraying the sausage surface.

EXAMPLE 2

Technological (after)effect of process adjuvants for spraying using the example of a spray/cutting agent for cutting and spraying the transport devices during the production/cutting up of poultry meat.

Result of testing MIQ Pro Chick (1%) for the abolition of a bactericidal/bacteriostatic effect (syn. microbiological/technological after effect) after contact with poultry protein following method B 4.2.3. BGA according to E. Petermann and G. Cerny.

| | |
|---|---|
| Material under investigation: | 1 sample of HIQ Pro Chick concentrate, registered trade mark of Schür in Process GmbH, Mönchen-gladbach |
| Investigation method: | B IV 4.2.3. BGA, microbiological measurement method; Agar diffusion test |
| Implementation: | A 1% dilution in a lysate of a chicken breast fillet, from Wiesenhof, HKL-A having a protein content of 30 g/l (Biuret method) was first of all prepared from the submitted material. This mixture was incubated at 6° C. for 18 h. On the following day, 10 ml, 50 ml and 100 ml of this mixture were pipetted into a CASO agar which was at pH 7.0 and into which spores of *Bacillus subtilis* BGA strain (DSM 614) had been poured; 3 wells per mixture. After a 2 hour prediffusion at 4° C., the plates containing the Bacillus spores were incubated at 30° C. for 3 days and then checked for inhibition haloes. A small antibiotic plate served as positive control for the Bacillus strain, while an agar sample which was only treated with spores was used as the growth control. In addition, the HIQ Pro Chick was examined, both in the above quantities and as a concentrated, 10% and 1% solution, without protein contact, for all inhibitory effect against *Bacillus subtilis*. This batch was implemented on 2 different days. |
| Investigation result: | Positive control: inhibitory halo of 40 mm around the antibiotic Growth control: good growth of *Bacillus subtilis* BGA Sample under investigation: 1% of HIQ Pro Chick in protein: No inhibitory haloes with 10, 50 and 100 ml sample quantities. HIQ Pro Chick without protein: No inhibitory haloes with 10, 50 and 100 ml sample volumes and 100%, 10% and 1% solution. |

Assessment in accordance with Method B IV 4.2.3. BGA:

According to the BGA (BgVV) test method employed in this case, it is not possible to demonstrate that the EIIQ Pro Chick sample has any bactericidal or bacteriostatic effect, i.e. any microbiological/technological aftereffect with chicken muscle extract either, in any of the experimental mixtures, even at a 10-fold dosage.

EXAMPLE 3

Process adjuvant for spraying cutting knives, as a cutting agent, and for spraying transport devices, using the example of sliced sausage and considering the reduction of spoilage-causing agents (enterobacteria/ lactobacilli) on cutting knives, transport devices and cut sausage surfaces, and improvement/extension of durability.

2a. Standard Method

| Sample No.: | Sample description | Found Total number of organisms/7 cm$^2$ | Comments |
|---|---|---|---|
| 1 | Belt | 67 | |
| 2 | Belt | ±100 | |
| 3 | Belt | ±100 | |
| 4 | Belt | 51 | 20 moulds |
| 5 | Sausage supporter | 8 | |
| 6 | Sausage supporter | 0 | |
| 7 | Knife (outer side) | 39 | |
| 8 | Knife (inner side) | 28 | |
| 9 | Knife box (inner side) | Huge numbers | |

2b. After Having Treated Cutting Surfaces and Transport Surfaces

| Sample No.: | Sample description | Found Total number of organisms/7 cm$^2$ |
|---|---|---|
| 18 | Belt after smearing with paper (13:12 h) | 1 |
| 19 | Belt after smearing with paper (13:12 h) | 0 |
| 20 | Belt after smearing with paper (13:22 h) | 0 |
| 21 | Belt after smearing with paper (13:20 h) | 1 |
| 22 | Belt after smearing with paper (13:30 h) | 18 |
| 23 | Belt after smearing with paper (13:30 h) | 4 |
| 24 | Belt during continuous spraying | 0 |
| 25 | Belt during continuous spraying | 0 |

-continued

| Sample No.: | Sample description | Found Total number of organisms/7 cm$^2$ |
|---|---|---|
| 26 | Sliced sausage (above) | 1 |
| 27 | Sliced sausage (below) | 0 |

2c. Checking the Durability of Packed Sausage
Sample designation:
 V=Sample prior to treatment
 M=Sample after smearing
 R=Sample after only spraying the belt
 MB=Sample during continuous spraying of the belt and the knife

| Date | Sample | Total no. of orgs. | Entero | Lacto | Staph. | Yeast | Moulds | Spore formation |
|---|---|---|---|---|---|---|---|---|
| Week 1 | V | <10$^2$ | <10 | <10$^2$ | <10$^2$ | <10$^2$ | <10$^2$ | <10$^2$ |
| | M | <10$^2$ | <10 | <10$^2$ | <10$^2$ | <10$^2$ | <10$^2$ | <10$^2$ |
| | R | <10$^2$ | <10 | <10$^2$ | <10$^2$ | <10$^2$ | <10$^2$ | <10$^2$ |
| | MB | <10$^2$ | <10 | <10$^2$ | <10$^2$ | <10$^2$ | <10$^2$ | <10$^2$ |
| Week 2 | V | 7.2 * 10$^3$ | <10 | <3 * 10$^6$ | <10 | <10 | <10 | <10$^2$ |
| | M | 3.2 * 10$^2$ | <10 | 2 * 10$^2$ | <10 | <10 | <10 | <10$^2$ |
| | R | 1.4 * 10$^3$ | <10 | 1.5 * 10$^3$ | <10 | <10 | <10 | <10$^2$ |
| | MB | 1.8 * 10$^4$ | <10 | 1.7 * 10$^4$ | <10 | <10 | <10 | <10$^2$ |
| Week 3 | V | 4.2 * 10$^5$ | 20 | 2.9 * 10$^8$ | <10$^2$ | <10$^2$ | <10$^2$ | <10$^2$ |
| | M | 2.4 * 10$^4$ | 60 | 6.3 * 10$^4$ | <10$^2$ | <10$^2$ | <10$^2$ | <10$^2$ |
| | R | 6.3 * 10$^5$ | 1.2 * 10$^4$ | 3.0 * 10$^5$ | <10$^2$ | <10$^2$ | <10$^2$ | <10$^2$ |
| | MB | 4.0 * 10$^5$ | 90 | 6.0 * 10$^5$ | <10$^2$ | <10$^2$ | <10$^2$ | <10$^2$ |
| Week 4 | V | 7.0 * 10$^7$ | <10 | 2.9 * 10$^8$ | <10$^2$ | <10$^2$ | <10$^2$ | <10$^2$ |
| | M | 8.0 * 10$^7$ | <10 | 6.3 * 10$^4$ | <10$^2$ | 200 | <10$^2$ | <10$^2$ |
| | R | 1.8 * 10$^7$ | <10 | 3.0 * 10$^5$ | <10$^2$ | <10$^2$ | <10$^2$ | <10$^2$ |
| | MB | 10$^4$ | <10 | 6.0 * 10$^5$ | <10$^2$ | <10$^2$ | <10$^2$ | <10$^2$ |
| Week 5 | V | 3.5 * 10$^8$ | <10 | 6.6 * 10$^8$ | <10$^2$ | <10$^2$ | <10$^2$ | 10 |
| | M | 5.0 * 10$^5$ | <10 | 7.0 * 10$^6$ | <10$^2$ | 200 | <10$^2$ | 250 |
| | R | 10$^4$ | <10 | 10$^5$ | <10$^2$ | <10$^2$ | <10$^2$ | 50 |
| | MB | 2 * 10$^2$ | <10 | <10$^2$ | <10$^2$ | <10$^2$ | <10$^2$ | 30 |

Results:

When sliced sausage is being produced, its durability increases indirectly due to the continuous use of the process adjuvants on the cutting knives and the transport device since the number of spoilage-causing agents appearing on the devices is substantially reduced.

According to the abovementioned experimental results, the durability of sausage is significantly improved by using the cutting agent which is applied to the cutting devices. At the same time, there is surprisingly good cleaning of the cutting surfaces of the cutting devices. Furthermore, the cuttability of the sausage is improved. The durability is substantially improved despite the high dilution of the substances employed. Outstanding results can be obtained with vegetable oils in dilutions of from 1:10 to 1:100.

EXAMPLE 4

Process adjuvant for cutting (cutting oil), by means of spraying on cutting knives (band slicer) and circular dish cutting machine, and spray for spraying the surfaces of the foodstuff, using toast bread as an example and considering the reduction of spoilage-causing agents on the machine parts and bread surfaces and/or cutting surfaces (moulds/Aspergillus niger) while at the same time improving/extending durability.

3a. Durability Assessment—Use of Sprays and Cutting Oil Additive (Termed Jet and Cut)

| Sample code | Number of samples | Number of stoppages in days |||||||||||||||||||
|---|---|---|---|---|---|---|---|---|---|---|---|---|---|---|---|---|---|---|---|---|
| | | 5 | 6 | 7 | 8 | 9 | 10 | 11 | 12 | 13 | 14 | 15 | 16 | 17 | 18 | 19 | 20 | 21 | 22 | 23 | 24 |
| E1- 1.8 g jet/ toast | 70 | 0 | 0 | 0 | 0 | 0 | 0 | 0 | 0 | 0 | 0 | 0 | 0 | 0 | 0 | 0 | 0 | 0 | 1 GB | 0 | 2 GB |
| E2- 1.0 g jet/ toast | 70 | 0 | 0 | 0 | 0 | 0 | 0 | 0 | 0 | 0 | 0 | 0 | 0 | 0 | 0 | 0 | 0 | 0 | 0 | 1 GV | 3 GV |
| E3- 0.6 g jet/ toast | 70 | 0 | 0 | 0 | 0 | 0 | 0 | 0 | 0 | 0 | 0 | 0 | 0 | 0 | 0 | 0 | 0 | 0 | 0 | 2 GB | 1 GB |
| E4- only | 70 | 0 | 0 | 0 | 0 | 0 | 0 | 0 | 0 | 0 | 0 | 0 | 0 | 0 | 0 | 0 | 0 | 1 | 2 GV | 4 GV | X GV |

-continued

| Sample code | Number of samples | \multicolumn{20}{c}{Number of stoppages in days} |
|---|---|---|---|---|---|---|---|---|---|---|---|---|---|---|---|---|---|---|---|---|
| | | 5 | 6 | 7 | 8 | 9 | 10 | 11 | 12 | 13 | 14 | 15 | 16 | 17 | 18 | 19 | 20 | 21 | 22 | 23 | 24 |
| knife with cut E5-standard or past. | 70 | 0 | 0 | 0 | 0 | 1 GV | 3 GV | 5 GV | 10 GV | 16 GV | X | | | | | | | | | | |
| E6-standard | 70 | 0 | 0 | 0 | 0 | 0 | 0 | 0 | 0 | 0 | 0 | 2 | 4 | 3 | 4 | 5 | 7 | X | | | |

Legend:
Mould colour:
G = Green,
Y = Yellow,
BL = Black,
W = White and
C = Chalk
Site at which mould found
A = Above,
B = Below,
S = Side,
CS = Cutting surface and
V = Various sites

Environment Hygiene

| Sample No.: | Description | Time | Bact./m³ | Moulds |
|---|---|---|---|---|
| 1 | Entry band slicer | 15:15 h | 260 | 50 |
| 2 | Exit slicer | 15:25 h | 225 | 25 |
| 3 | Cooling tower, middle of room | 15:30 h | 13 | <13 |
| 4 | Packaging machine | 15:30 h | 400 | 62 |
| 5 | CO₂ injector | 15:40 h | 750 | 88 |
| 6 | Packaging | 16:00 h | 63 | 25 |

Result:

When sliced bread is being produced, its durability is extended indirectly of the continuous use of the process adjuvants for spraying onto bread surfaces and cutting the bread with cutting oil (addition of the process adjuvant, in proportion to the cutting oil, to the cutting oil), since the number of moulds (spoilage-causing agents) is substantially reduced. Chemical preservation or pasteurization is no longer necessary.

EXAMPLE 5

Brocess adjuvant for nebulizing in the air, considering the reduction of the spoilage-causing agents in the air (mould/Aspergillus niger) and prevention of resedimentation onto baked goods, using baked goods as an example, with the result that durability is improved/extended.

4*a*. Measirement of the Number of Organisms in the Air Prior to the Treatment

Biotest Air sampler, in each case 2 min. (80 ltr. of air)

| Sample No.: | Sample description | Bacteria | Moulds |
|---|---|---|---|
| 1 | Cold room before nebulizing between the cooling towers | 38 | |
| 2 | Stairs region before entering the cold room | 1,500 | |
| 3 | Exit from cold room to packaging | 2,500 | 625 |
| 4 | 1st cooling tower before the cooling plant airstream, prior to nebulizing, 10:00 h | 75 | 13 |
| 5 | 1st cooling tower before the cooling plant airstream, directly prior to nebulizing, 11:30 h | 80 | 140 |

4*b*. Measurement of the Number of Organisms in the Air During/After the Treatment

| Sample No.: | Sample description | Bacteria | Moulds |
|---|---|---|---|
| 6 | 1st cooling tower before the cooling plant airstream, during nebulizing, 11:45 h | 15 | 13 |
| 7 | 1st cooling tower before the cooling plant | 0 | 0 |

-continued

| Sample No.: | Sample description | Bacteria | Moulds |
|---|---|---|---|
| 8 | airstream, at the end of nebulizing, 13:00 h<br>1st cooling tower before the cooling plant airstream, after nebulizing, 14:00 h | 0 | 0 |

4*c*. Durability Assessment After Using Nebulizing Agent (termed FOG)

| Sample code | Number of samples | Number of stoppages in days 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|
| 532 containing additive | 16 | 0 | 0 | 0 | 0 | 0 | 0 | 0 | 0 | 0 | 2 GB | 2 GB | 3 GB | 1 GB | 2 GB | 0 | 1 GB | 1 GB | 2 GB | 3 GV |
| 505 containing additive | 16 | 0 | 0 | 0 | 0 | 0 | 0 | 0 | 0 | 0 | 0 | 0 | 1 GB | 1 BLA | 1 GB | 0 | 1 GB | 1 GB | 1 GB | 2 GV |
| 505 containing Fog after 60 min. | 16 | 0 | 0 | 0 | 0 | 0 | 0 | 0 | 0 | 0 | 0 | 0 | 0 | 0 | 0 | 0 | 0 | 1 GB | 2 GB | 8 GB |
| 505 containing Fog after 120 min. | 16 | 0 | 0 | 0 | 0 | 0 | 0 | 0 | 0 | 0 | 0 | 0 | 0 | 0 | 0 | 0 | 0 | 0 | 1 GB | 4 GB |
| 505 containing Fog after 180 min. | 16 | 0 | 0 | 0 | 0 | 0 | 0 | 0 | 0 | 0 | 0 | 0 | 0 | 0 | 0 | 0 | 0 | 0 | 0 | 2 GB |
| 505 containing Fog after 240 min. | 16 | 0 | 0 | 0 | 0 | 0 | 0 | 0 | 0 | 0 | 0 | 0 | 0 | 0 | 0 | 0 | 0 | 0 | 0 | 0 |

Legend:
Mould colour:
G = Green,
Y = Yellow,
BL = Black,
W = White and
C = Chalk
Site at which mould found
A = Above,
B = Below,
CS = Cutting surface,
V = Various sites
Additive = Preservative
Fog = Without preservative and using the nebulizing agent in the air Result:

When baked goods are being produced, their durability is extended indirectly by th continuous use of the process adjuvant for nebulizing in the air (cooling tower, cooling/transport section), wit the number of moulds in the air being substantially reduced. Chemical preservation or pasteurization of th baked goods is no longer necessary.

EXAMPLES 6 to 17

In the next examples, the following materials and methods were employed:

Materials and Methods

| | | | |
|---|---|---|---|
| 1. | Test organisms: | *E. coli* | ATCC11229 |
| | | *Staph. aureus* | ATCC6538 |
| | | *Ps. aeruginosa* | ATCC15442 |
| | | *C. albicans* | ATCC10231 |
| | | *A. niger* | ATCC16404 |
| | | *Cladosporium herbarum* (our own isolate) | |
| 2. | Nutrient media: | CSA (Tryptone Soya Agar Oxoid CM 131) | |
| | | CSB (Tryptone Soya Broth Oxoid CM 129) | |
| | | YGC agar (Merck 16000) | |
| | | Tween 80 (Merck) | |

3. Implementation of the Tests 3.1. In-vivo Test for Determining the Shortest Durability The fungi and bacteria are taken up with a swab (stroke across the grown plate with turning movements) and spread uniformly, e.g. over the cut surface of a sliced bread sample so that a concentration of $10^3$–$10^4$ spores or microorganisms is achieved per 100 $cm^2$.

0.2–0.3 ml of the test substance is sprayed, using an aerosol spray, onto 100 $cm^2$ of sliced bread surface. The test bread samples are packed in plastic bags (polyethylene or polypropylene) and the plastic bags are closed and stored at room temperature in the light.

The growth of microorganisms on the contaminated bread samples is compared with that on control bread. The number of days after which a growth of microorganisms can be recognized with the nlked eye for the first time is taken as the shortest durability.

3.2. In-vitr Test: Quantitative Suspension Method in Accordance with DGHM I2.3.1.[1]

Overnight cultures (or, in the case of, for example, *A. niger* and *C. albicans*, 3-day cultures) are suspended in physiological saline (0.8% ) until the desired concentration ($10^6$ fungal organisms/ml or $10^8$ bacterial organisms/ml) has been reached. After that, 9 ml of the test substance are inoculated with 1 ml of the suspension.

An exposure time of from 5 min to 1 hour is chosen for organisms such as Staph. aureus, Pseudomonas and *E. coli*, while an exposure time of 1.6 and 24 hours is chosen for *A. niger* and *C. albicans*. During the exposure time, the suspensions are shaken regularly.

After expiry of the exposure time, a dilution series of the test suspension is set up in CSB (oxoid) which contains substances which inactivate the flavouring substance(s) which has/have been tested in each case. For example, 0.1% by weight of histidine is added for inactivating aldeehydes, 1% by weight of Tween $80^R$ is added for inactivating phenols, 0.2% by weight of Tween$^R$ is added for inactivating alcohols, and 0.03% by weight of lecithin is added for inactivating acids, esters, inter alia. In the case of bacteria, CSA (oxoid), in the case of *A. niger/C. albicans* YGC Agar (Merck), is poured over 1 ml of each dilution.

after 24–48 hours of incubation, the plates are evaluated and the destruction factor is determined as the reduction factor (RF) in relation to a growth control of $10^{5-107}$ CFU/ml.

Deutsche Gesellschaft für Hygiene und Mikrobiologie [German Society for Hygiene and Microbiology]; Richtlinien für die Prüfung und Bewertung chemischer Desinfektionsverfahren [Guidelines for Testing and Evaluating Chemical Disinfection Methods]. Zentralblatt für Bakteriologie, Mikrobiologie und Hygiene, Reilie B, Vol. 172, No. 6 (1981).

3.3 Gas-phase Test Method

The gas-phase test method is used to determine the destruction factor when using gas-phase-active process adjuvants.

The determination is carried out in a so-called double petri dish. 0.5 ml of the gas-phase-active agent is added to, for example, bread or small urea/formaldehyde foam blocks (0.5'1'3 cm) which are located on an absorbing surface. The bread or the small foam blocks are placed in one compartment of a subdivided petri dish.

A filter paper disc (diameter: 13 mm) which is inoculated with from approx. $10^8$ to $10^9$ organisms is placed in another compartment of the same petri dish. The dish is sealed in an airtight manner and incubated at a temperature of 30° C. for 24 hours.

Following the incubation, the filter paper disc is suspended in 9 ml of CSB and a dilution series is prepared in CSB. The tubes are incubated at 30° C. and evaluated. The destruction factor is determined in comparison with the control.

3.4 Gas-phase Suspension Method

The gas-phase suspension method is used to carry out a first investigation for bactericidal and/or fungicidal properties.

In order to carry out the method, melt molten nutrient media corresponding to the particular test microorganism concerned are inoculated with from $10^5$ to $10^6$ organisms per ml. The nutrient media are poured into petri dishes and cooled.

80 ml of the agent to be tested (additive or process adjuvant) are loaded onto a filter paper disc (diameter: 13 mm; Schleicher & Schüll, Article 601/2) and four of the filters prepared in this way are distributed uniformly on the surface of a prepared petri dish. The plates are subsequently incubated at 37RC for 24 hours. After the incubation, the size of any region of inhibition which arises is determined.

3.5 Preservation Test

The preservation test was determined in accordance with USP XVII/NF DVII, US Pharmacopeia, United States Pharmacopeial Convention, Rockville, MD 20852.

EXAMPLE 6

Synergistic Effect of Alcohols Which are Readily Soluble in Water, a Flavour Aldehyde and a Flavour Phenol.

In this experiment, whose results are presented in the following Table, the individual effects of ethanicl and isopropanol at concentrations of 20 and 1% by weight, and also the combined effect of 0.2% by weight of anisaldehyde and 0.04% by weight of oi-eganum oil, are compared with the synergistic effect of the combination of anisaldehyde, oreganum oil and in each case one of the aforementioned water-soluble alcohols. The experiment was carried out a quantitative suspension experiment.

|  | Reduction factors | |
| --- | --- | --- |
| Exposure time, 1 h | *A. niger* | *Staph. aureus* |
| Anisaldehyde, 0.2% by weight | 0 | 3.3 |
| Oreganum oil, 0.04% by weight | | |
| (Active compound combination 5E) | | |
| 20% by weight of ethanol | 0 | 3.4 |
| 20% by weight of isopropanol | 0.5 | 0.3 |
| 20% by weight of ethanol + 5E | 5.4 | 7.7 |
| 20% by weight of isopropanol + 5E | 5.4 | 7.7 |
| 1% by weight of ethanol | 0 | 0 |
| 1% by weight of isopropanol | 0 | 0 |
| 1% by weight of ethanol + 5E | 0.9 | 7.7 |
| 1% by weight of isopropanol + 5E | 0.1 | 5.5 |
| Growth control | log CFU: 5.4 | log CFU: 7.7 |

The values indicate that a 1% solution of the alcohols used in this experiment, and also the active compound combination 5E on its own, are completely ineffective in the case of *Aspergillus niger*; the active compound combination 5E has a moderate effect in the case of *Staphylococcus aureus*. A 20% solution of alcohol on its own also has virtually no microbicidal effect on *Aspergillus niger*, whereas it is only the ethanol solution which has a moderate microbicidal effect on Staphylococcus aureus. However, a combination of ethanol or isopropanol with the active compound combination 5E almost always results, when a 20% solution of alcohol is used, in a 100% microbicidal effect; while a combination of 1% alcohol solutions with the active compound combination SE still gives a 70 to 100% microbicidal effect in the case of Staphylococcus aureus at least.

EXAMPLE 7

Decontaminating and/or Microbicidal Activity of Individual Flavouring Substances.

The decontaminating and/or microbicidal activity of flavouring substances from the groups of the alcohols, aldehydes and phenols, and also different combinations from these groups, was once again determined using the quantitative suspension method. The resultsve presented in the following table.

TABLE

| Individual substances Flavouring substances | % by weight of flavouring substance in $H_2O$ | Asp. niger exposure time 1 h: 6 h Reduction factor[1] (initial number of organisms in log $CFU^2$/ml: 5.5) | Staph. aureus exposure time 1 h Reduction factor (initial number of organisms in log CFU/ml: 7.9) | |
|---|---|---|---|---|
| Group I: alcohol | | | | |
| Anise alcohol | 1% | 0.3 | 1.0 | 2.1 |
| Hydrocinnamyl alcohol | 1% | 0.3 | 3.2 | 7.9 |
| Isopropanol | 75% | 5.5 | 5.5 | 7.9 |
| Isopropanol | 20% | 0.5 | 1.5 | 0.3 |
| Isopropanol | 1% | 0 | 0 | 0 |
| Ethanol | 75% | 5.5 | 5.5 | 7.9 |
| Ethanol | 20% | 0.5 | | 0.3 |
| Ethanol | 1% | 0 | | 0 |
| Group II: aldehydes | | | | |
| Anisaldehyde | 0.2% | 0 | 4.2 | |
| Citronellal | 0.2% | 0 | 2.1 | |
| Perillaldehyde | 0.2% | 0 | 2.6 | |
| Group III: phenols | | | | |
| Oreganum oil | 0.04% | 0 | 3.1 | 1.4 |
| Rosemary extract | 0.04 | 0.2 | 0.2 | 1.6 |

EXAMPLE 8

Influence of the Novel Cutting/Separating Agent on the Durability of Bread

The durability of sliced bread was investigated a) on bread which was sliced using conventional cutting agents and which was not inoculated with microorganisms, and on bread which was sliced using the novel cutting agent and which was artificially contaminated after having been sliced.

EXAMPLE 9

Comparison of the Influence of Conventional Cutting Agents on the Durability of Sliced Bread with That of Novel Cutting Agents.

The results of this comparative experiment are given in the following Table.

| | Durability of sliced bread in days | |
|---|---|---|
| Cutting/separating agent according to Table 6 | Control bread sliced using cutting oil without a novel process adjuvant | Control bread sliced using cutting/separating agents according to Table 6 |
| a | 3 | 11 |
| b | 3 | 8 |

EXAMPLE 10

Extension of the Durability of Sliced Bread by Mild Thermal Aftertreatment of the Foodstuff Sliced Using a Cutting/Separating Agent.

The following table shows the durability of sliced bread which, on the one hand, was sliced using conventional cutting oil and, on the other, using cutting/separating agents according to Table 6, and which was not subjected to any thermal aftertreatment, and, subsequently, of such bread which was sliced using novel cutting/separating agents and subsequently subjected to a mild thermal after treatment.

| | | Durability of the sliced bread in days | | | |
|---|---|---|---|---|---|
| Cutting/separating agent | % by weight based on the ready-to-use agent | Control bread, sliced bread, untreated 20° C. | Cladosporium herbarum $5 \cdot 10^4$ CFU/100 $cm^2$ of bread 20° C. | A. niger $2 \cdot 10^4$ CFU/100 $cm^2$ of bread 20° C. | Staph. aureus $4 \cdot 10^4$ CFU/100-$cm^2$ of bread 20° C. |
| a) Soya bean oil | 99% | 3 | 9 | 8 | 12 |
| Anisaldehyde | 1% | | | | |
| b) soya bean oil | 97.4% | 3 | 7 | 6 | 10 |
| Caprylcapric acid triglyceride | 1% | | | | |
| lecithin | 1% | | | | |
| anisaldehyde | 0.15% | | | | |
| hydrocinnamyl alcohol | 0.45% | | | | |

TABLE 8

Durability of sliced bread in days

| Cutting/separating agent | Control bread sliced using cutting oil without a novel process adjuvant | Control bread sliced using a cutting/ separating agent according to Table 6 | Bread sliced using a cutting/ separating agent according to Table 6 and subjected to a thermal aftertreatment | | |
|---|---|---|---|---|---|
| | | | Exposure time in s/min | Core temp. in °C. | Durability in days |
| a | 3 | 11 | 10 s | 30° C. | 12 |
| | | | 30 s | 36° C. | 13 |
| | | | 1 min. | 41° C. | 15 |
| | | | 2 min. | 45° C. | 17 |
| | | | 5 min. | 50° C. | 20 |
| b | 3 | 12 | 10 s | 30° C. | 13 |
| | | | 30 s | 36° C. | 14 |
| | | | 1 min. | 41° C. | 16 |
| | | | 2 min. | 45° C. | 17 |
| | | | 5 min. | 50° C. | 19 |

EXAMPLES 11–17

The following process adjuvants are introduced below by way of example:

Example:
11 Cutting agent
12 Heat/cold transferring agent
13 Emulsifier, separating agent and cleansing agent
14 Lubricant
15 Gas-phase-active agent
16 Nebulizing agent
17 Spray The recipe examples consist, by way of example, of individual and/or several flavour function groups combined amongst themselves and/or combined synergistically.

The process adjuvants are used either undiluted or following dilution with water and/or foodstuff-admissible solvents and/or vegetable (fatty) oils and/or emulsifiers of from 0.01% by weight to 99.99% by weight, preferably in a mixing ratio of from 1:1 to 1:100.

Some application examples for the use of one or more process adjuvants for durability stabilization and/or improvement and/or environment impaction in 5the case of, for example:

| | Process adjuvant employed | Example No.: |
|---|---|---|
| Toast bread | Nebulizing agent | 16 |
| | Cutting agent | 11 |
| | Spray | 17 |
| Fancy cakes and pastries | Nebulizing agent | 16 |
| Sliced sausage | Cutting agent | 11 |
| | Emulsifier, separating agent, cleansing agent | 13 |
| Grilling sausage | Spray | 17 |
| Boiler water for heating chocolate mass | Heat transferring agent, cold transferring agent | 12 |
| Conveyor belt | Lubricant | 14 |
| Waste container | Gas-phase-active agent | 15 |

The following recipe Examples 1–62 are representative examples of the flavour function groups individually or combined severally among each other and/or synergistically.

| | Function group | FDA flavour | Example % by weight |
|---|---|---|---|
| 1 | Alcohol | Glycerol | 100 |
| 2 | Alcohol/ aldehyde | Glycerol/ hexyl aldehyde | 92 8 |
| 3 | Alcohol/ aldehyde/ phenol | Acetoin/ anisaldehyde/anisole | 71 20 9 |
| 4 | Alcohol/ phenol | Propyl alcohol/thymol | 95 5 |
| 5 | Aldehyde- phenol | Acetaldehyde/ eugenol | 84 16 |
| 6 | Alcohol/ acid | Citronellol/ tartaric acid | 76 24 |
| 7 | Alcohol/ aldehyde/ acid | Anise alcohol/ hydrocinnamaldehyde citric acid | 62 28 10 |
| 8 | Alcohol/aldehyde/ phenol/ acid | Glycerol/ citral/ estragole/ tannic acid | 40 14 18 28 |
| 9 | Aldehyde | Perillaldehyde | 100 |
| 10 | Aldehyde/ acid | Perillaldehyde/formic acid | 85 15 |
| 11 | Alcohol/ phenol/ acid | Benzyl alcohol/isoeugenol/ fumaric acid | 77 18 5 |
| 12 | Acetate | Linalyl acetate | 100 |
| 13 | Aldehyde/ phenol/ acid | Propionaldehyde/carvacrol/ phenyl acetic acid | 35 20 45 |
| 14 | Acetal | Acetal | 100 |
| 15 | Alcohol/ acetate | Cinnamyl alcohol/ hydrocinnamyl acetate | 51 49 |
| 16 | Alcohol/ aldehyde/ acetate | Acetoin/ acetaldehyde/ eugenol acetate | 55 35 10 |
| 17 | Alcohol/ alcohol | Isopropanol/citronellol | 45 55 |
| 18 | Aldehyde/ aldehyde | Anisaldehyde/benzaldehyde | 64 36 |
| 19 | Acetate/ acetate | Sodium acetate/ethyl acetate | 50 50 |
| 20 | Acetal/ acetal | Cinnamaldehyde ethylene glycol acetal/ acetaldehyde phenethylpropyl acetal | 63 37 |

-continued

| Function group | FDA flavour | Example % by weight |
|---|---|---|
| 21 Phenol/ phenol | Thymol/ anisole | 25 75 |
| 22 Acid/ acid | Valeric acid/mandelic acid | 30 70 |
| 23 Ester/ ester | Allicin/ onion | 80 20 |
| 24 Terpene/ terpene | Dill/ limonene | 24 76 |
| 25 Phenol/ polyphenol | Thymol/ gallotannin | 35 65 |
| 26 Phenol | Carvacrol | 100 |
| 27 Polyphenol | Gallotannin | 100 |
| 28 Acid | Malic acid | 100 |
| 29 Ester | Allicin | 100 |
| 30 Terpene | Camphor | 100 |
| 31 Alcohol/aldehyde/ phenol/ acetate | Linalool/ heptanal/ propenylguaethol/ triacetin | 30 21 18 31 |
| 32 Alcohol/ aldehyde/ phenol/ acetate/ acid | Glycerol/ hydrocinnamaldehyde/ fornesol/ potassium acetate/ phenylacetic acid | 40 18 13 19 10 |
| 33 Acetate/ aldehyde | Sodium diacetate/acetaldehyde | 44 56 |
| 34 Acetate/ phenol | Benzyl acetate/ a-bisabolol | 65 35 |
| 35 Acetate/ acid | Lavender/ tartaric acid | 70 30 |
| 36 Acetate/ alcohol/ acid | Ethyl acetate/borneol/ pelargonic acid | 8 42 50 |
| 37 Acetate/ aldehyde/ acid | Iso-amyl acetate/dodecanal/ 3-methylbutanoic acid | 30 40 30 |
| 38 Acetate/ phenol/ acid | Cinnamyl acetate/anethole caproic acid | 35 41 24 |
| 39 Acetate/ alcohol/ aldehyde/ acid | Calcium acetate/heptanol/ benzaldehyde acetic acid | 50 19 10 21 |
| 40 Acetate/ alcohol/ phenol/ acid | Geranyl acetate/cineol/ thymol/phenylacetic | 16 35 20 29 |
| 41 Acetal/ alcohol/ aldehyde | Heptanal glyceryl acetal/ nerolidol/ propanal | 10 40 50 |
| 42 Acetal/ alcohol | Acetal/ 1-phenylethanol | 57 43 |
| 43 Acetal/ acid | Acetaldehyde phenethylpropyl acetal/ nonanoic acid | 70 30 |
| 44 Acetal/ alcohol/ acid | Acetal/ isopropanol/ acetic acid | 32 48 20 |
| 45 Acetal/ phenol | Acetal/ carvacrol | 88 12 |
| 46 Ester/ alcohol/ terpene/ acid | Allicin/ glycerol/ camphor/ acetic acid | 40 40 10 10 |
| 47 Ester/ alcohol/ aldehyde | Allicin/ acetoin/ n-octanal | 20 60 20 |
| 48 Ester/ acid | Allicin/ aconitic acid | 80 20 |
| 49 Ester/ phenol | Allicin/ acetyl-eugenol | 88 12 |
| 50 Ester/ acetate | Allicin/ sodium acetate | 37 63 |
| 51 Ester/ aldehyde | Allicin/ acetaldehyde | 78 22 |
| 52 Ester/ alcohol/ acid | Allicin/ rhodinol/ tannic acid | 8 62 30 |
| 53 Terpene/ alcohol/ acid | Limonene/ linalool | 18 82 |
| 54 Terpene/ alcohol/ aldehyde | b-caryophyllene/coriander/ lemon grass | 30 35 35 |
| 55 Terpene/ ester/ alcohol/ acid | Camphor/ allicin/balm/ citric acid | 15 28 7 50 |
| 56 Terpene/ester/ alcohol/ aldehyde | Limonene/ allicin/ benzyl alcohol/vanillin | 42 15 25 18 |
| 57 Polyphenol/ alcohol/ acid | Gallotannin/ 2-phenylethanol/pentanoic acid | 17 65 18 |
| 58 Terpene/ acid | Limonene/ fumaric acid | 70 30 |
| 59 Terpene/ phenol | Camphor/ thymol | 20 80 |
| 60 Terpene/ acetate | Limonene/ lavender | 63 37 |
| 61 Terpene/ aldehyde | Limonene/ citral | 48 52 |
| 62 Polyphenol/ alcohol/ aldehyde | Gallotannin/cuminol/ cuminaldehyde | 29 42 29 |

Example 18

Bacteriological Activity Test

The effective ness of aqueous systems containing ethanol; benzyl alcohol, ethanol+acid (e.g. lactic acid); or benzyl alcohol+acid (e.g. lactic acid); at a duration of action of 1.0 hours has been summarized in the following table:

| | Reduction Factors | |
|---|---|---|
| | Bacteria | Mold |
| ethanol 1.0% by weight | 0 | 0 |
| benzyl alcohol 1.0% by weight | 0 | 0 |
| 1.0% by weight ethanol + 0.2% by weight lactic acid | 0 | 0 |
| 1.0% by weight benzyl alcohol + 0.2% by weight lactic acid | 3.6 | 1.5 |
| growth control | log CFU 7.7 | log CFU 5.4 |

At a lower concentration of <75%, ethanol and benzyl alcohol do not possess any microbiocidal capabilities. In contrast to ethanol (and similarly isopropanol), once having formed appropriate synergisms benzyl alcohol is capable of reducing bacterial growth and the growth of molds.

What is claimed is:

1. A cutting agent which comprises an antimicrobial composition consisting essentially of (a) benzyl alcohol and (b) a GRAS-flavoring polyphenol and (c) a vegetable oil.

2. The cutting agent of claim 1 wherein the ratio of the antimicrobial composition to oil is 1:1 to 1:100.

3. The cutting agent of claim 1, which the compounds (a) and (b) comprise less than 50% by weight benzylalcohol.

4. The cutting agent of clain, in which the compounds (a) and (b) comprise less than 20% by weight benzylalcohol.

5. The cutting agent of claim 1, which further comprises anisaldehyde.

6. The cutting agent of claim 5, which further comprises oreganum oil.

* * * * *